United States Patent
Wang et al.

(10) Patent No.: US 9,167,294 B2
(45) Date of Patent: Oct. 20, 2015

(54) APPARATUS FOR SWITCHING TELEVISION CHANNELS AND METHOD THEREOF

(71) Applicant: ALi (Zhuhai) Corporation, Guangdong (CN)

(72) Inventors: Wei-Duo Wang, Guangdong (CN); Lei-Ming Xu, Guangdong (CN)

(73) Assignee: ALi (Zhuhai) Corporation, Guangdong (CN)

( * ) Notice: Subject to any disclaimer, the term of this patent is extended or adjusted under 35 U.S.C. 154(b) by 105 days.

(21) Appl. No.: 14/151,645

(22) Filed: Jan. 9, 2014

(65) Prior Publication Data

US 2015/0085196 A1 Mar. 26, 2015

(30) Foreign Application Priority Data

Sep. 25, 2013 (CN) .......................... 2013 1 0441513

(51) Int. Cl.
*H04N 7/26* (2006.01)
*H04N 21/438* (2011.01)

(52) U.S. Cl.
CPC .................................. *H04N 21/4384* (2013.01)

(58) Field of Classification Search
CPC ............ H04N 5/4401; H04N 21/4384; H04N 21/4263; H04N 21/4347; H04N 21/434; H04N 21/4383
See application file for complete search history.

(56) References Cited

U.S. PATENT DOCUMENTS

| | | | | |
|---|---|---|---|---|
| 5,956,088 A | * | 9/1999 | Shen et al. | 375/240.25 |
| 7,307,671 B2 | * | 12/2007 | Garandeau | 348/731 |
| 8,532,146 B2 | * | 9/2013 | Kim et al. | 370/486 |
| 8,532,459 B2 | * | 9/2013 | Heath et al. | 386/241 |
| 2009/0021641 A1 | * | 1/2009 | Matsuura et al. | 348/553 |
| 2011/0298990 A1 | * | 12/2011 | Ishii et al. | 348/731 |
| 2012/0027382 A1 | * | 2/2012 | Chung et al. | 386/241 |
| 2012/0133840 A1 | * | 5/2012 | Shirasuka et al. | 348/732 |
| 2014/0089962 A1 | * | 3/2014 | Ogawa et al. | 725/29 |
| 2014/0173679 A1 | * | 6/2014 | Kimura et al. | 725/132 |

* cited by examiner

*Primary Examiner* — Victor Kostak
(74) *Attorney, Agent, or Firm* — J.C. Patents

(57) ABSTRACT

An apparatus for switching television channels and a method thereof are provided. The apparatus for switching television channels includes a tuner unit, at least two video de-multiplexing modules and a switch unit. The tuner unit locks a specific frequency point in a broadcast stream, and the frequency point has at least two program channels. After the tuner unit locks the specific frequency point, each of the video de-multiplexing modules simultaneously and respectively receives the broadcast stream, and performs a de-multiplexing operation and a decoding operation to each of the program channels to generate at least two program streams. The switch unit selects and displays one of the at least two program streams corresponding to a first program channel, and when a second program channel is selected, the switch unit selects and displays the other one of the at least two program streams corresponding to the second program channel.

12 Claims, 3 Drawing Sheets

APPARATUS FOR SWITCHING TELEVISION CHANNELS AND METHOD THEREOF

CROSS-REFERENCE TO RELATED APPLICATION

This application claims the priority benefit of China application serial no. 201310441513.1, filed on Sep. 25, 2013. The entirety of the above-mentioned patent application is hereby incorporated by reference herein and made a part of this specification.

BACKGROUND

1. Technical Field

The invention relates to a switch technique of television channels. Particularly, the invention relates to an apparatus for switching television channels and a method thereof.

2. Related Art

Along with progress of multimedia technology, digital video devices such as digital televisions and set-top boxes are widely used. Multimedia practitioners also provide multiple television channels to facilitate the users enjoying rich audio and video resources.

When the user watches a digital television program of a certain channel, and wants to switch to an adjacent channel, it generally takes several seconds before images and sounds of the corresponding program are decoded after the user presses a corresponding key, which leads to a result that the user feels a noticeable pause. Such sense of pause is due to that a tuner in a digital television receiver is required to transmit a received video stream to an image decoding module for decoding, and the image decoding module performs video decoding according to a decoding technique corresponding to the video stream, and the above two steps consume more processing time. For example, the video stream is composed of an I-frame, a P-frame and a B-frame, and the image decoding module has to receive the I-frame in the video stream in order to decode the P-frame and the B-frame.

A channel switching time can be reduced in order to mitigate the aforementioned sense of pause, and one method thereof is to simultaneously use a plurality of tuners to reduce the time consumed in locking frequency points of the channels. However, based on statistics, it is known that the most time-consuming step is not switching of different frequency points, but is that the image decoding module cannot quickly decode the video stream. Therefore, it is necessary to provide a method to quickly switch television channels, such that the user may have better operation experience when watching the digital video device.

SUMMARY

The invention is directed to an apparatus for switching television channels and a method thereof, by which a time required for waiting channel switch is reduced, and television channels are quickly switched, such that a user has better operation experience when viewing a digital video device.

The invention provides an apparatus for switching television channels. The apparatus for switching television channels includes a tuner unit, at least two video de-multiplexing modules and a switch unit. The tuner unit locks a specific frequency point in a broadcast stream, and the frequency point has at least two program channels. The video de-multiplexing modules are coupled to the tuner unit. After the tuner unit locks the specific frequency point, each of the video de-multiplexing modules simultaneously and respectively receives the broadcast stream, and performs a de-multiplexing operation and a decoding operation to each of the program channels to generate at least two program streams corresponding to each of the program channels respectively. The switch unit is coupled to the at least two video de-multiplexing modules. The switch unit selects and displays one of the at least two program streams corresponding to a first program channel, and when a second program channel is selected, the switch unit selects and displays the other one of the at least two program streams corresponding to the second program channel, wherein the at least two program channels include the first program channel and the second program channel.

In an embodiment of the invention, the apparatus for switching television channels further includes a processing unit. The processing unit is coupled to the tuner unit and the switch unit, and establishes, controls and executes the at least two video de-multiplexing modules.

In an embodiment of the invention, each of the video de-multiplexing modules is composed of a firmware chip.

In an embodiment of the invention, the tuner unit includes at least one tuner, and each tuner is used for selecting and locking at least one specific frequency point in a plurality of frequency points.

In an embodiment of the invention, the video de-multiplexing module includes a de-multiplexing module and a decoding module. The de-multiplexing module is used for extracting a packet identifier corresponding to each of the program channels from the broadcast stream, so as to obtain one of the at least two program streams corresponding to each of the program channels. The decoding module is used for decoding the one of the at least two program streams to obtain video and audio corresponding to each of the program channels.

In an embodiment of the invention, the program stream includes video stream data and audio stream data.

In an embodiment of the invention, the at least two video de-multiplexing modules perform the de-multiplexing operation and the decoding operation to adjacent or continuous program channels.

The invention provides a method for switching television channels, which includes following steps. A specific frequency point in a broadcast stream is locked, and the frequency point has at least two program channels. At least two video de-multiplexing modules are established, and after the specific frequency point is locked, each of the video de-multiplexing modules simultaneously and respectively receives the broadcast stream, and performs a de-multiplexing operation and a decoding operation to each of the program channels to generate at least two program streams corresponding to each of the program channels respectively. One of the at least two program streams corresponding to a first program channel is selected and displayed, where the at least two program channels include the first program channel. When a second program channel is selected, the other one of the at least two program streams corresponding to the second program channel is selected and displayed, where the at least two program channels include the second program channel.

In an embodiment of the invention, the specific frequency point is at least one specific frequency point in a plurality of frequency points.

In an embodiment of the invention, the step of performing the de-multiplexing operation and the decoding operation to each of the program channels includes following steps. A packet identifier corresponding to each of the program channels is extracted from the broadcast stream, so as to obtain one of the at least two program streams corresponding to each of the program channels. One of the at least two program streams is decoded to obtain the video and audio corresponding to each of the program channels.

In an embodiment of the invention, the program stream includes video stream data and audio stream data.

In an embodiment of the invention, the at least two video de-multiplexing modules perform the de-multiplexing operation and the decoding operation to adjacent or continuous program channels.

According to the above descriptions, in the apparatus and method for switching television channels of the invention, after the frequency point is locked, a plurality of video de-multiplexing modules are used to simultaneously perform the de-multiplexing operation and the decoding operation to the program channels respectively. In this way, when the user wants to switch a channel, the time required for waiting the channel switch is reduced, and the television channels are quickly switched, such that the user has better operation experience when viewing a digital video device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
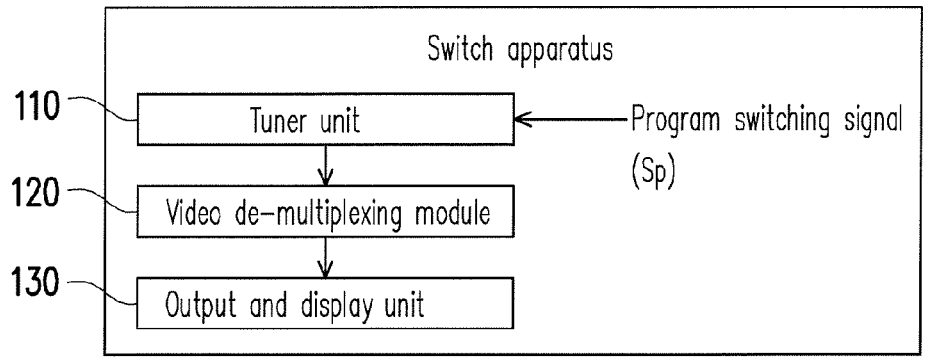
FIG. 1 is a block diagram of an apparatus for switching television channels.

FIG. 1 is a block diagram of an apparatus for switching television channels. Referring to FIG. 1, the apparatus for switching television channels 100 includes a tuner unit 110, a video de-multiplexing module 120 and an output and display unit 130. The apparatus for switching television channels 100 of the present embodiment can be a digital television, a set-top box or other electronic apparatus having a video processing device such as a computer, etc., and the user can suitably adjust the applied equipment according to an implement method thereof, which is not limited by the invention.

The tuner unit 110 can be a satellite tuner, a cable tuner, a terrestrial tuner or other similar devices or a combination of the above devices. In the present embodiment, the tuner unit 110 includes at least one tuner, which is used for locking a specific frequency point in a broadcast stream corresponding to a program channel. The video de-multiplexing module 120 is coupled to the tuner unit 110. In the present embodiment, the video de-multiplexing module 120 receives the broadcast stream after the tuner unit 110 locks the frequency point, and performs a de-multiplexing operation and a decoding operation to each of the program channels to generate a program stream corresponding to each of the program channels. The output and display unit 130 can be a screen or audio equipment that is capable of outputting video or audio data or a combination thereof. The output and display unit 130 is coupled to the video de-multiplexing module 120, and outputs and displays the program stream after receiving the program stream produced by the video de-multiplexing module 120.

In the present embodiment, when the user presses a previous/next key to switch a previous/next program channel, the tuner unit 110 receives a program switching signal Sp corresponding to the above action, and locks a corresponding frequency point in the broadcast stream according to the target program channel to be switched. In detail, the broadcast stream may correspond to a plurality of different broadcast types such as satellite broadcast, cable broadcast or terrestrial broadcast, etc., and the tuner unit 110 may also have corresponding types and applications according to different types of the broadcast stream. The broadcast stream may include a packet identifier (PID) and program specific information/service information (PSI/SI), etc. The packet identifier is information used for distinguishing different programs in the broadcast stream. Generally, under a same frequency point, the previous/next program channel switched by pressing the previous/next key is the adjacent channel on the frequency point (i.e. the serial numbers of the program channel PIDs are adjacent to each other), and the program channels switched by continuously pressing the previous/next key are continuous channels on the frequency point (i.e. the serial numbers of the program channel PIDs are continuous). The PSI/SI is basic information of digital video broadcasting, which is used for describing a network, a broadcast stream, a program event and a service, etc.

In an embodiment, the tuner unit 110 may include a demodulator coupled to the tuner, which is used for modulating an output signal of the tuner unit 110 to a baseband signal, so as to output the broadcast stream with a frequency of the aforementioned frequency point. In an embodiment, the tuner can also be coupled between the tuner unit 110 and the video de-multiplexing module 120, and those skilled in the art may adopt different coupling patterns according to an actual requirement, which is not limited by the invention. Moreover, the aforementioned frequency point refers to a radio frequency band used for transmitting the broadcast stream, which includes a specific frequency and the corresponding bandwidth. One frequency point may include one or a plurality of television channels.

Then, after the tuner unit 110 locks the frequency point according to the program switching signal Sp, the video de-multiplexing module 120 receives the aforementioned broadcast stream, and extracts a packet identifier corresponding to the target program channel from the broadcast stream, so as to obtain the program stream corresponding to the target program channel. Then, the video de-multiplexing module 120 decodes the program stream to obtain video and audio corresponding to the target program channel. The output and display unit 130 receives the video and audio and displays the same, such that the user can view the television program of the switched television channel.

According to the aforementioned descriptions, during a process of switching the television channels, the aforementioned steps are sequentially executed after the channel switching signal is received from the user. The video de-multiplexing module waits and receives the program stream, and the video de-multiplexing module starts to execute decoding and the subsequent steps until an I-frame that can be decoded without using the previous image is appeared in the received program stream, and then the decoded video and audio are output and displayed. In other words, if the I-frame is not appeared in the program stream transmitted to the video de-multiplexing module, the video de-multiplexing module keeps waiting for appearance of the I-frame. Therefore, during the process of switching the television channels, a plenty of time is consumed in the decoding step of the video de-multiplexing module.

In this way, the spirit of the embodiments of the invention is as follows. After the tuner unit locks the frequency point, the apparatus for switching television channels applies at least two video de-multiplexing modules to simultaneously and respectively perform the de-multiplexing operation and the decoding operation to each of the program channels. Namely, a multiplexing approach is applied to simultaneously execute the step that consumes more time in the process of switching the television channel, such that the video and audio corresponding to each of the program channels are pre-decoded before the program switching signal is received. In this way, when the user sends the program switching signal, the apparatus for switching television channels of the invention can output the decoded video and audio to the display unit, such that the television channel to be viewed by the user can be quickly switched. Further, if the number of the video de-multiplexing modules of the apparatus for switching television channels is less than the number of the program channels in the frequency point, the de-multiplexing operation and the decoding operation can be only performed to the adjacent program channels of the currently watched program channel. In this way, at least the speed of switching the previous/next program channel by pressing the previous/next key can be increased. Namely, the video de-multiplexing modules in the apparatus for switching television channels perform the de-multiplexing operation and the decoding operation to the adjacent or continuous program channels in the frequency point.

Figure 2:
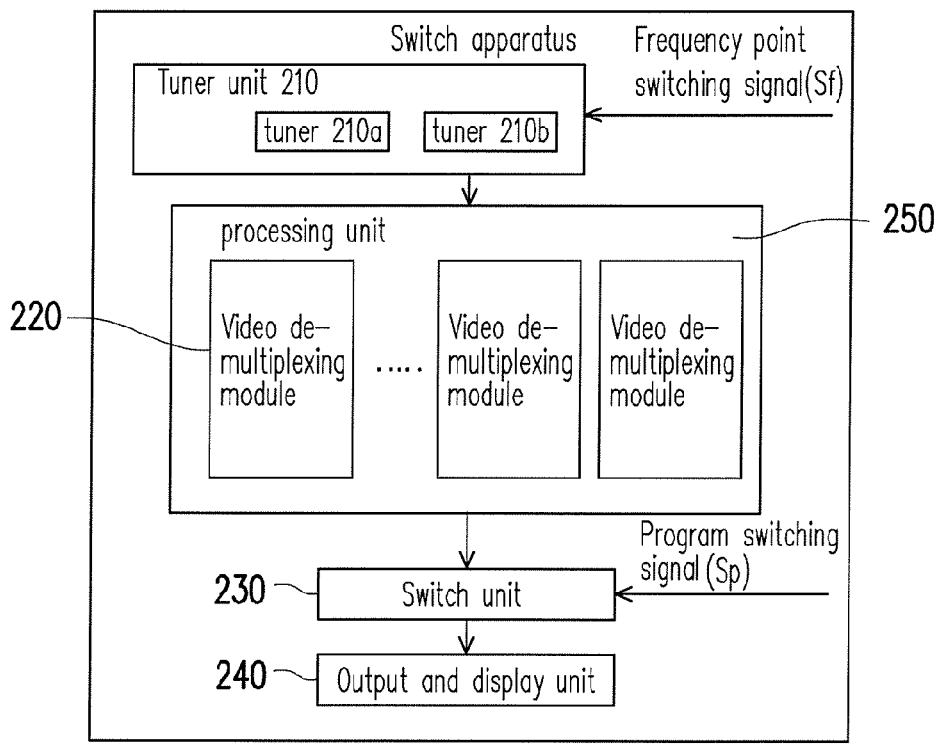
FIG. 2 is a block diagram of an apparatus for switching television channels according to an embodiment of the invention.

The method for switching television channels of the embodiment of the invention is described below with reference of FIG. 2. FIG. 2 is a block diagram of an apparatus for switching television channels according to an embodiment of the invention. In the present embodiment, the apparatus for switching television channels 200 includes a tuner unit 210, at least two video de-multiplexing modules 220, a switch unit 230 and an output and display unit 240. The apparatus for switching television channels 200 of the present embodiment can be a digital television or other electronic apparatus having a video processing device such as a set-top box, a computer, etc., and the user can suitably adjust the applied equipment according to an implement method thereof, which is not limited by the invention. A part of the components of the present embodiment and operation methods thereof have been described above, and details thereof are not repeated.

In the present embodiment, the tuner 210 locks a specific frequency point. It should be noticed that in other embodiments, the tuner unit 210 may also include a plurality of tuners to simultaneously lock a plurality of specific frequency points, and those skilled in the art can provide a selection of one or a plurality of frequency points to implement switching of television channels on a same frequency point or different frequency points according to an actual requirement, which is not limited by the invention.

In the present embodiment, after the tuner unit 210 locks the frequency point, at least two video de-multiplexing modules are established. The video de-multiplexing modules 220 simultaneously and respectively receive a broadcast stream, and perform a de-multiplexing operation and a decoding operation to each of the program channels to generate at least two program streams corresponding to each of the program channels. In other words, after the tuner unit 210 locks the frequency point, the video de-multiplexing modules 220 simultaneously perform the de-multiplexing operation and the decoding operation to each of the program channels on the aforementioned frequency point in a multiplexing approach.

The switch unit 230 is coupled to the at least two video de-multiplexing modules 220. The switch unit 230 can be a selector, a multiplexer, or a logic circuit formed by logic gates, or other similar components or a combination of the above components. In the present embodiment, the switch unit 230 selects and outputs the video and audio corresponding to the television channel to be switched according to the program switching signal Sp sent by the user.

Figure 3:
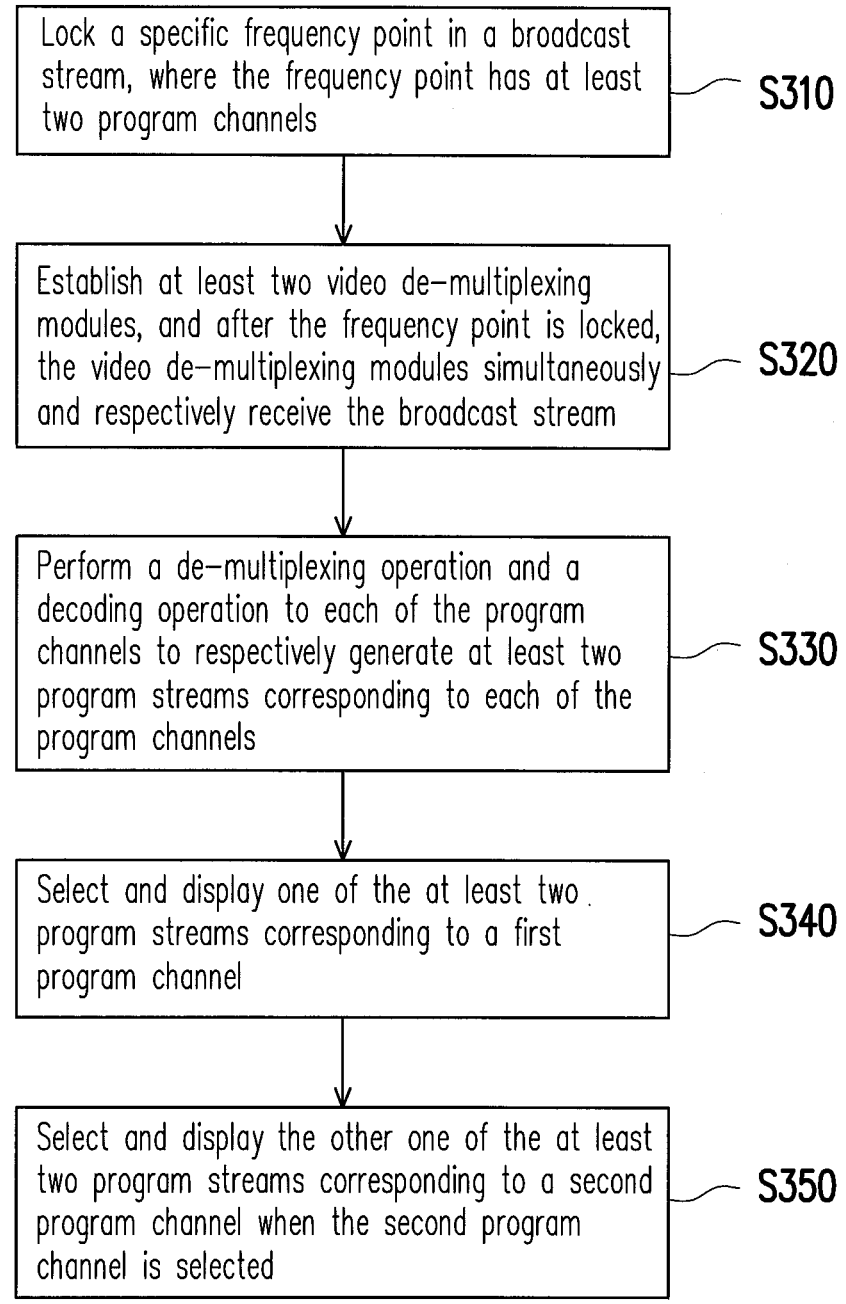
FIG. 3 is a flowchart illustrating a method for switching television channels according to an embodiment of the invention.

FIG. 3 is a flowchart illustrating a method for switching television channels according to an embodiment of the invention. Referring to FIG. 2 and FIG. 3, the method of the embodiment of the invention is adapted to the aforementioned apparatus for switching television channels 200, and details of the method of the present embodiment are described below with reference of various components of the apparatus for switching television channels 200.

In step S310, the tuner unit 210 locks the specific frequency point in the broadcast stream according to a frequency point switching signal Sf, where the frequency point switching signal Sf can be determined by the program switching signal Sp sent by the user. When the target program channel to be switched by the user and the currently displayed program channel belong to different frequency points, the corresponding frequency point switching signal Sf is generated. The tuner unit 210 receives the frequency point switching signal Sf to lock the corresponding frequency point.

In step S320, the apparatus for switching television channels 200 establishes at least two video de-multiplexing modules 220, and after the tuner unit 210 locks the frequency point, the video de-multiplexing modules 220 simultaneously and respectively receive the broadcast stream.

In the present embodiment, the apparatus for switching television channels 200 may include a processing unit, which is coupled to the tuner unit 210 and the switch unit 230, and is used for establishing, controlling and executing the aforementioned at least two video de-multiplexing modules 220. In an embodiment, the aforementioned at least two video de-multiplexing modules 220 can be respectively composed of a firmware chip, where the firmware chips respectively receive the broadcast stream, perform the de-multiplexing operation and the decoding operation to each of the program channels, and generate a program stream corresponding to each of the program channels. Implementation of the video de-multiplexing modules can be different according to an actual requirement, which is not limited by the invention.

In step S330, corresponding to each of the program channels, each of the video de-multiplexing modules 220 performs the de-multiplexing operation and the decoding operation to each of the program channels to respectively generate at least two program streams corresponding to each of the program channels, where the program stream includes video stream data and audio stream data. In other words, in the present embodiment, after the tuner unit 210 locks the specific frequency point, the apparatus for switching television channels 200 can use the video de-multiplexing modules 220 to simultaneously perform the de-multiplexing operation and the decoding operation to each of the program channels in a multiplexing approach, so as to generate the program stream corresponding to each of the program channels.

Figure 4:
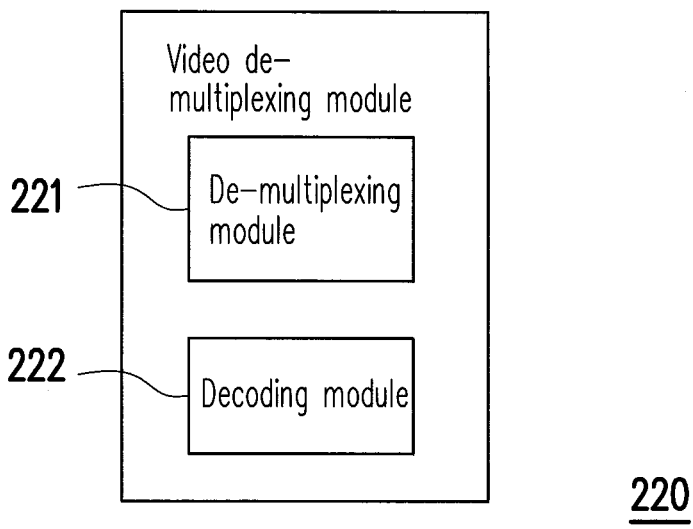
FIG. 4 is a block diagram of a video de-multiplexing module according to an embodiment of the invention.
Figure 5:
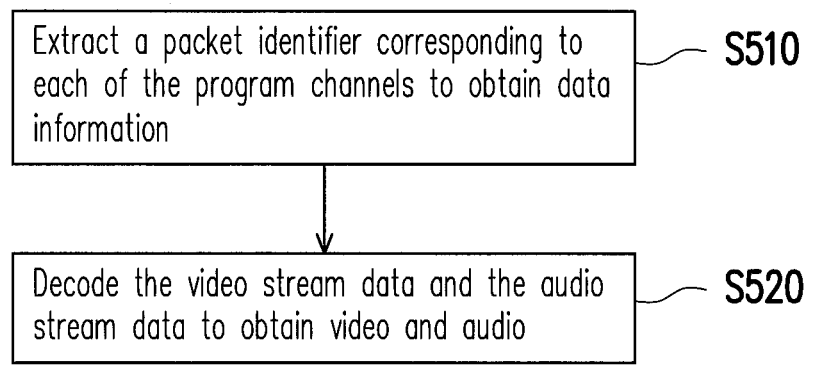
FIG. 5 is a flowchart illustrating a video de-multiplexing method according to an embodiment of the invention.

Further, in an embodiment, the video de-multiplexing module may include a de-multiplexing module and a decoding module respectively used for executing the de-multiplexing operation and the decoding operation. Referring to FIG. 4 and FIG. 5, FIG. 4 is a block diagram of the video de-multiplexing module according to an embodiment of the invention, and FIG. 5 is a flowchart illustrating a video de-multiplexing method according to an embodiment of the invention. The video de-multiplexing module 220 of FIG. 4 includes a de-multiplexing module 221 and a decoding module 222. The method flow of FIG. 5 is adapted to the video de-multiplexing module 220, and detailed steps of the method flow are described with reference of various components of the video de-multiplexing module 220 of FIG. 4.

In step S510, the de-multiplexing module 221 is used for extracting a packet identifier corresponding to each of the program channels from the broadcast stream, so as to obtain one of the at least two program streams corresponding to each of the program channels. In detail, according to the aforementioned descriptions, the broadcast stream may include the packet identifier. The de-multiplexing module 221 performs the de-multiplexing operation to the broadcast stream to extract the packet identifier from the broadcast stream, and obtains the program streams corresponding to each of the program channels from the broadcast stream according to the packet identifier.

In step S520, the decoding module 222 is used for decoding one of the at least two program streams to obtain video and audio corresponding to each of the program channels. As that described above, the broadcast stream may include program specific information/service information (PSI/SI) used for describing a network, a broadcast stream, a program event and a service, etc. The decoding module 222 decodes the PSI/SI to obtain the program streams corresponding to each of the program channels, where the program stream includes video stream data and audio stream data.

In this way, the de-multiplexing module and the decoding module are used to complete the video de-multiplexing flow, and the video de-multiplexing modules in the apparatus for switching television channels 200 may respectively include the de-multiplexing module and the decoding module, which respectively perform the de-multiplexing operation and the decoding operation to each of the program channels according to the aforementioned video de-multiplexing method.

Referring back to the flow of FIG. 3, in step S340, the switch unit 230 selects and displays one of the at least two program streams corresponding to a first program channel, where the at least two program channels include the first program channel. In other words, the switch unit 230 is used for determining the output and displayed program channel.

In an embodiment, the switch unit 230 may pre-select one of the program channels corresponding to the aforementioned specific frequency point, and displays the corresponding program stream on the output and display unit 240. For example, when the user activates the apparatus for switching television channels 200, the tuner unit 210 may pre-lock the specific frequency point, and the switch unit 230 pre-locks a specific program channel in the specific frequency point and outputs the same to display.

In an embodiment, the switch unit 230 may also display the corresponding program stream on the output and display unit 240 according to a previous selection of the program channel. For example, the apparatus for switching television channels 200 may record the program channel that is output and displayed before the apparatus for switching television channels 200 is turned off. When the user activates the apparatus for switching television channels 200 for the next time, the tuner unit 210 locks the frequency point according to the aforementioned record of the program channel, and the switch unit 230 outputs and displays the program channel according to the previous selection of the program channel.

In step S350, when the second program channel is selected, the switch unit 230 selects and displays the other one of the at least two program streams corresponding to the second program channel, where the at least two program channels include the second program channel. In detail, when the switch unit 230 receives the program switching signal Sp sent by the user, the switch unit 230 selects the program stream corresponding to the program channel to be switched by the user from the program streams generated by the video de-multiplexing modules 220 according to the program switching signal Sp, and displays the selected program stream on the output and display unit 240.

For example, when the user wants to switch the currently viewed program channel to another program channel, the switch unit 230 selects the program stream corresponding to the target program channel to be switched by the user from the program streams generated by the video de-multiplexing modules 220 according to the program switching signal Sp, and outputs and displays the selected program stream for the user to view.

In this way, after the frequency point is locked, the apparatus for switching television channels of the present embodiment simultaneously and respectively perform the de-multiplexing operation and the decoding operation to each of the program channels. Therefore, when the user wants to switch the program channel, the time required for waiting the channel switch is reduced, so as to quickly switch the television channels.

It should be noticed that in the aforementioned embodiment, a situation that the tuner unit locks one specific frequency point is taken as an example for descriptions, and in other embodiments, the tuner unit may also include a plurality of tuners, and each of the tuners is used for selecting and locking at least one specific frequency points in a plurality of frequency points. Regarding the television channels on each of the frequency points, the apparatus for switching television channels of the invention also has the corresponding video de-multiplexing modules to simultaneously perform the de-multiplexing operation and the decoding operation. In this way, besides that the apparatus for switching television channels of the invention can be used to switch different television channels in a same frequency point, it can also be used to switch the television channels of a plurality of frequency points, so as to implement diversified applications.

In summary, in the apparatus and method for switching television channels of the embodiments of this invention, after the frequency point is locked, the de-multiplexing operation and the decoding operation are simultaneously and respectively performed to the program channels, where the de-multiplexing operation and the decoding operation can be implemented by the video de-multiplexing modules established and executed by the processing unit, or implemented by the firmware chip. In this way, the time required for waiting the channel switch is reduced, so as to quickly switch the television channels, such that the user has better operation experience when viewing a digital video device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An apparatus for switching television channels, comprising:
   a tuner unit, locking a specific frequency point in a broadcast stream, wherein the frequency point has at least two program channels;
   at least two video de-multiplexing modules, coupled to the tuner unit, and after the tuner unit locks the frequency point, each of the video de-multiplexing modules simultaneously and respectively receives the broadcast stream, and performs a de-multiplexing operation and a decoding operation to each of the program channels to respectively generate at least two program streams corresponding to each of the program channels; and
   a switch unit, coupled to the at least two video de-multiplexing modules, for selecting and displaying one of the at least two program streams corresponding to a first program channel, and when a second program channel is selected, the switch unit selects and displays the other one of the at least two program streams corresponding to the second program channel, wherein the at least two program channels comprise the first program channel and the second program channel.

2. The apparatus for switching television channels as claimed in claim 1, further comprising:
   a processing unit, coupled to the tuner unit and the switch unit, for establishing, controlling and executing the at least two video de-multiplexing modules.

3. The apparatus for switching television channels as claimed in claim 1, wherein each of the video de-multiplexing modules is composed of a firmware chip.

4. The apparatus for switching television channels as claimed in claim 1, wherein the tuner unit comprises at least one tuner, and the at least one tuner is used for selecting and locking at least one specific frequency point in a plurality of frequency points.

5. The apparatus for switching television channels as claimed in claim 1, wherein the video de-multiplexing module comprises:
   a de-multiplexing module, extracting a packet identifier corresponding to each of the program channels from the broadcast stream, so as to obtain one of the at least two program streams corresponding to each of the program channels; and
   a decoding module, decoding the one of the at least two program streams to obtain video and audio corresponding to each of the program channels.

6. The apparatus for switching television channels as claimed in claim 5, wherein the program stream comprises video stream data and audio stream data.

7. The apparatus for switching television channels as claimed in claim 1, wherein the at least two video de-multiplexing modules perform the de-multiplexing operation and the decoding operation to adjacent or continuous program channels.

8. A method for switching television channels, comprising:
   locking a specific frequency point in a broadcast stream, wherein the frequency point has at least two program channels;
   establishing at least two video de-multiplexing modules, and after the frequency point is locked, each of the video de-multiplexing modules simultaneously and respectively receives the broadcast stream, and performs a de-multiplexing operation and a decoding operation to each of the program channels to generate at least two program streams corresponding to each of the program channels respectively;
   selecting and displaying one of the at least two program streams corresponding to a first program channel, wherein the at least two program channels comprise the first program channel; and
   selecting and displaying the other one of the at least two program streams corresponding to a second program channel when the second program channel is selected, wherein the at least two program channels comprise the second program channel.

9. The method for switching television channels as claimed in claim 8, wherein the specific frequency point is at least one specific frequency point in a plurality of frequency points.

10. The method for switching television channels as claimed in claim 8, wherein the step of performing the de-multiplexing operation and the decoding operation to each of the program channels comprises:
    extracting a packet identifier corresponding to each of the program channels from the broadcast stream, so as to obtain one of the at least two program streams corresponding to each of the program channels; and
    decoding the one of the at least two program streams to obtain the video and audio corresponding to each of the program channels.

11. The method for switching television channels as claimed in claim 10, wherein the program stream comprises video stream data and audio stream data.

12. The method for switching television channels as claimed in claim 8, wherein the at least two video de-multiplexing modules perform the de-multiplexing operation and the decoding operation to adjacent or continuous program channels.

* * * * *